United States Patent [19]

Ichimura et al.

[11] Patent Number: 4,934,787
[45] Date of Patent: Jun. 19, 1990

[54] MODE SCRAMBLER

[75] Inventors: Kiyoshi Ichimura; Hiroshi Okada, both of Tokyo; Masatoshi Toda, Kanagawa; Satoshi Takahashi; Masayoshi Komiya, both of Tokyo, all of Japan

[73] Assignee: Mitsubishi Rayon Co., Ltd., Tokyo, Japan

[21] Appl. No.: 386,880

[22] Filed: Jul. 27, 1989

[51] Int. Cl.⁵ .............................................. G02B 6/16
[52] U.S. Cl. .............................. 350/96.29; 350/96.15
[58] Field of Search ............... 350/96.15, 96.16, 96.29, 350/96.30, 96.31, 96.33, 96.34

[56] References Cited

U.S. PATENT DOCUMENTS

| 4,229,067 | 10/1980 | Love ................................. 350/96.15 |
| 4,676,594 | 6/1987 | Presby ............................... 350/96.29 |

FOREIGN PATENT DOCUMENTS

| 54-138452 | 10/1979 | Japan ................................. 350/96.15 |
| 59-37503 | 3/1984 | Japan ................................. 350/96.15 |
| 60-43610 | 3/1985 | Japan ................................. 350/96.29 |
| 60-178409 | 9/1985 | Japan ................................. 350/96.15 |
| 61-259225 | 11/1986 | Japan ................................. 350/96.15 |
| 2166257 | 4/1986 | United Kingdom ............. 350/96.15 |

Primary Examiner—John D. Lee
Attorney, Agent, or Firm—Albert L. Jeffers

[57] ABSTRACT

A mode scrambler capable of converting the mode distribution of light transmitted through an optical fiber into a stationary mode distribution. The mode scrambler comprises a plurality of cylinders arranged in a predetermined arrangement, and a step index optical fiber of 100 μm or above in core diameter and 0.4 or above in numerical aperture wound around and across the plurality of cylinders. The step index optical fiber is wound at least in one 8-shaped wind at least across the two cylinders of the plurality of cylinders. At least the diameter of one of two cylinders across which the step index optical fiber is wound in an 8-shape is not less than ten times and not more than fifty times the core diameter of the step index optical fiber, and the diameter of the other cylinder is not less than that of the former cylinder.

2 Claims, 8 Drawing Sheets

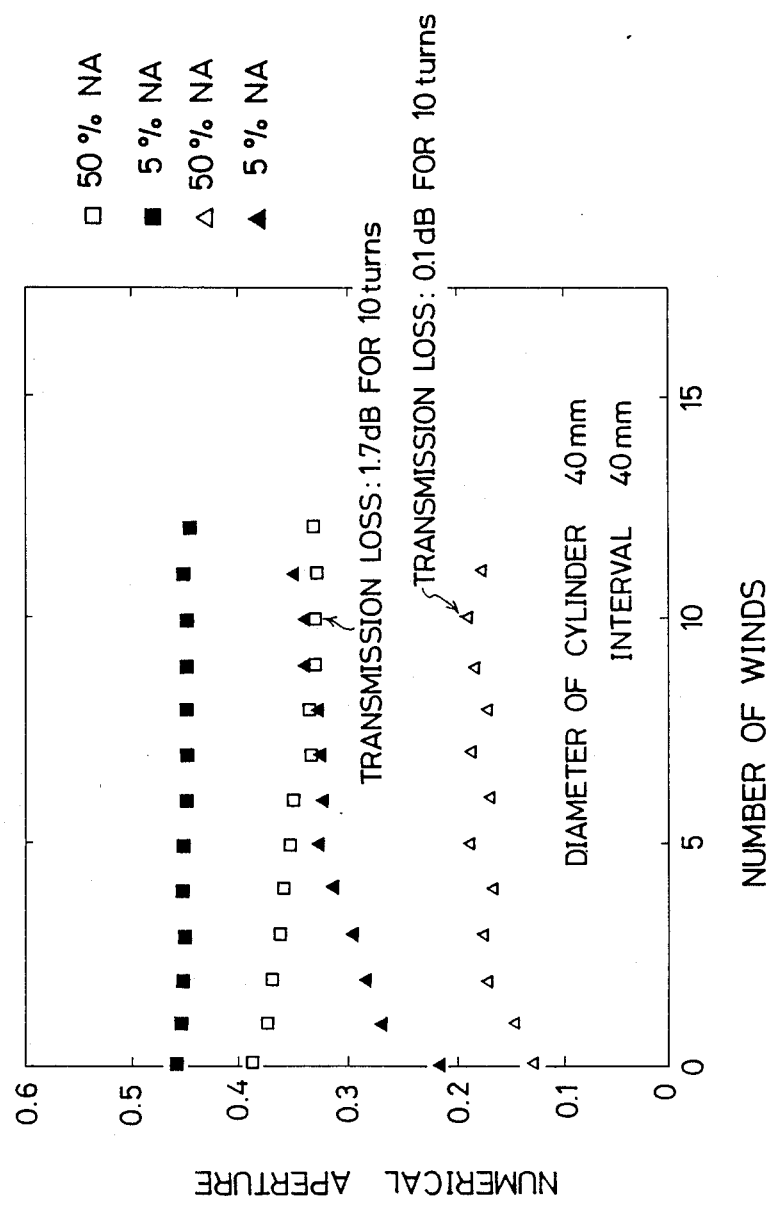

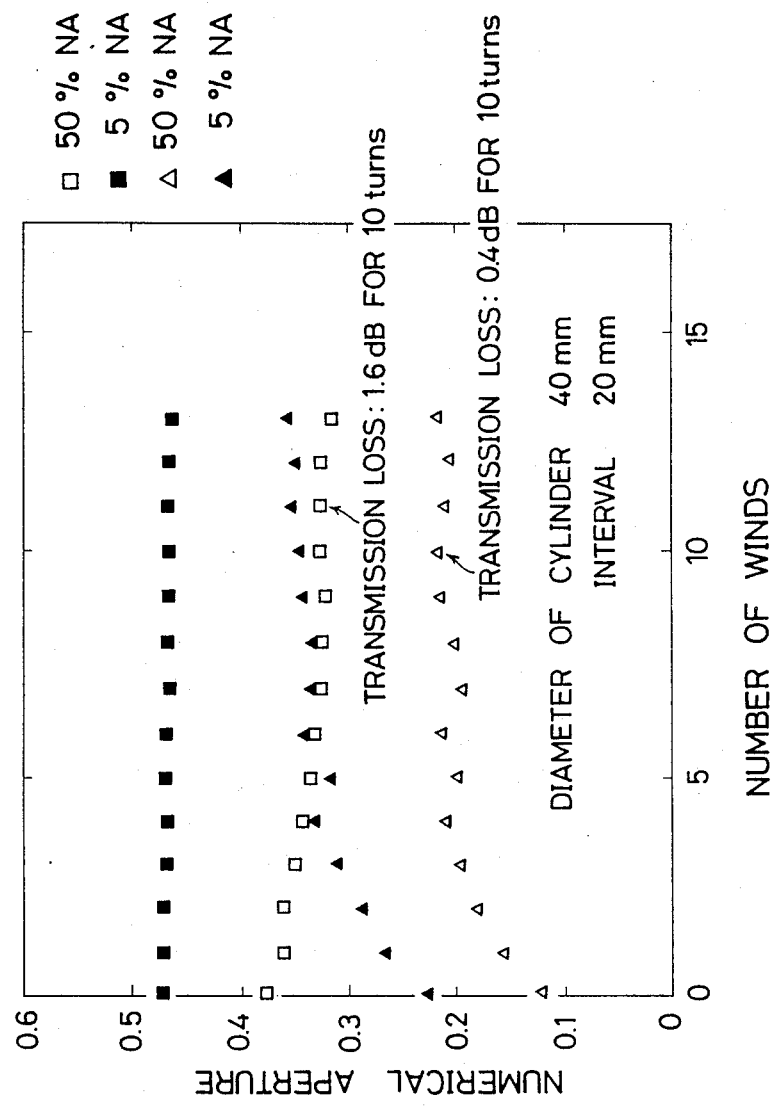

FIG.8(a)
FIG.8(b)
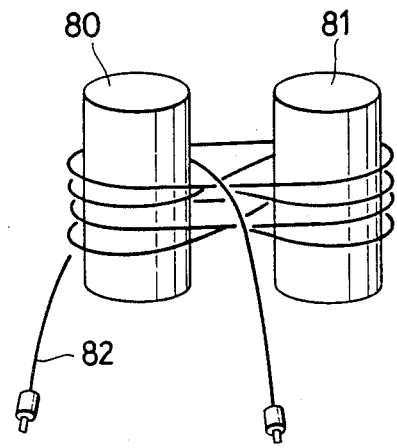
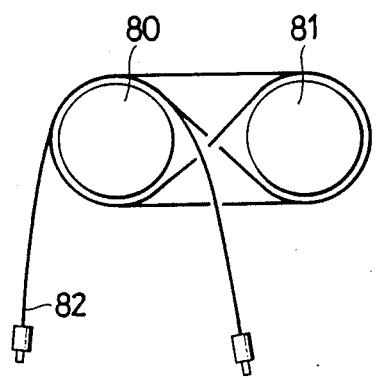
FIG.9(a)
FIG.9(b)
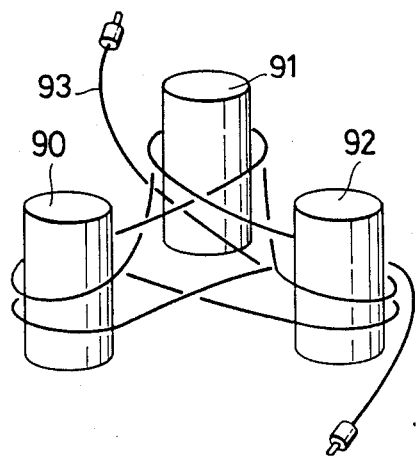
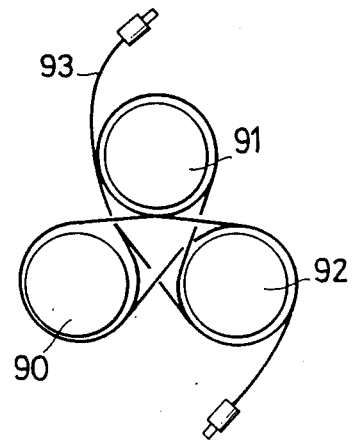

MODE SCRAMBLER

BACKGROUND OF THE INVENTION

Field of the Invention

The present invention relates to a mode scrambler and, more specifically, to a mode scrambler capable of rapidly scrambling the mode distribution of light transmitted through an optical fiber to establish a stationary mode distribution.

In measuring the optical transmission loss characteristics and transmission band characteristics of an optical fiber in the field of optical fiber communication or optical fiber measurement, particularly, in the field of optical fiber measurement, it is essential to the standardization of measuring conditions that the incident light falling on the measuring instrument is in a stationary mode distribution. A stationary mode distribution is a state in which the mode distribution of light transmitted through an optical fiber is a certain outgoing distribution independent of the conditions of the incident light and axial position in the optical fiber.

A certain distance is necessary to establish a stationary mode distribution in a multimode optical fiber. A long distance as long as ten meters or longer is necessary to establish a stationary mode distribution of transmitted light particularly in a plastic optical fiber. A mode scrambler has been developed to establish the stationary mode distribution of incident light emitted from a light source readily and at a low transmission loss.

A mode scrambler employing a quartz optical fiber having a small numerical aperture of less than 0.4 and wound around a plurality of cylinders for mode conversion is reported in Tokuda et al., Denki Tsushin Gakkai Hikari.Denpa Bumon Zenkoku Taikai Koen Ronbunshu S3-9, 1976.

J.P. Provisional Pub. (Kokai) No. 60-178409 discloses a mode scrambler having a construction similar to the foregoing mode scrambler of Tokuda et al., employing an optical fiber longitudinally twisted and bent by a plurality of pins.

A further mode scrambler employing a quartz optical fiber wound helically around a cylinder has been proposed.

The mode scrambling performance of a mode scrambler of the conventional construction is effective when the optical fiber is a thin optical fiber having a core diameter of several tens micrometers or less, such as a quartz optical fiber. However, a conventional mode scrambler is unable to function effectively when the mode scrambler employs a thick optical fiber of 100 μm or above in core diameter and 0.4 or above in numerical aperture, such as a step index optical fiber, and the conventional mode scrambler capable of satisfactory performance is inevitably very large.

In a mode scrambler comprising a cylinder and an optical fiber having a large core diameter, particularly, a plastic optical fiber having a large core diameter, wound helically around the cylinder, the mode distribution of the outgoing light is dependent on the diameter of the cylinder and the conditions of the incident light, and only light of higher mode or lower mode is distributed. Thus, this mode scrambler is unable to function satisfactorily.

SUMMARY OF THE INVENTION

Accordingly, it is an object of the present invention to provide a compact practically effective mode scrambler capable of establishing a stationary mode distribution within a short length of an optical fiber even if the optical fiber is a step index optical fiber of 100 μm or above in core diameter and 0.4 or above in numerical aperture.

The object of the invention is achieved by a mode scrambler comprising a plurality of cylinders, and an optical fiber wound around the cylinders, characterized in that the optical fiber is wound at least in one 8-shaped wind at least around and across the two cylinders among the plurality of cylinders, the diameter of one of the two cylinders is not less than ten times and not more than fifty times the core diameter of the optical fiber, and the diameter of the other cylinder is not less than the diameter of the former cylinder.

BRIEF DESCRIPTION OF THE DRAWINGS

FIGS. 4, 5 and 6 are diagrams showing the dependence of the NA (numerical aperture) of the optical fiber of the mode scrambler of the present invention on the number of turns of the optical fiber wound around the cylinders;

FIGS. 8(a) and 8(b) are a perspective view and a plan view, respectively, of a mode scrambler in a second embodiment according to the present invention;

FIGS. 9(a) and 9(b) are a perspective view and a plan view, respectively, of a mode scrambler in a third embodiment according to the present invention;

DETAILED DESCRIPTION OF THE PREFERRED EMBODIMENTS

Prior to the description of the preferred embodiments of the present invention, the relation between stationary mode distribution and numerical aperture NAe will be described.

Figures 1A, 1B:
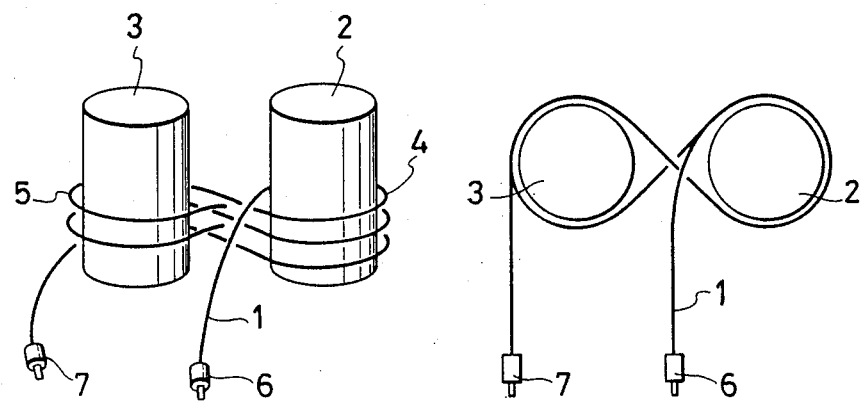
FIGS. 1(a) and 1(b) are a perspective view and a plan view, respectively, of a mode scrambler in a first embodiment according to the present invention.
Figure 2A:
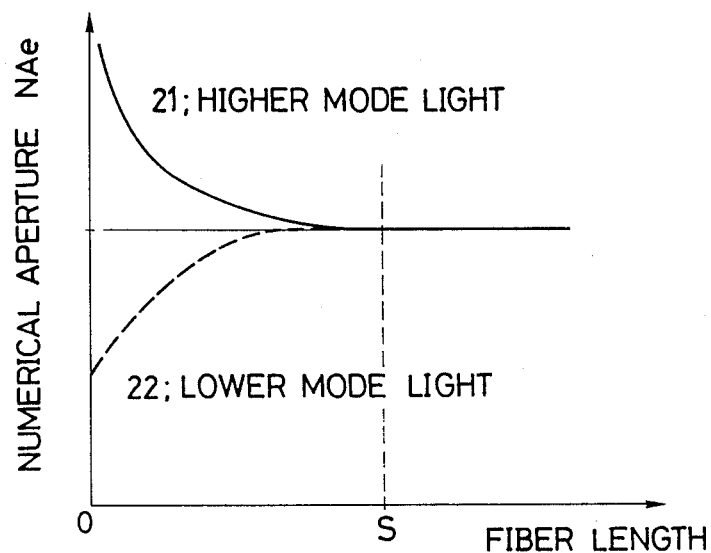
FIG. 2(a) is a graph of assistance in explaining the dependence of the numerical aperture NAe of an optical fiber on the length of optical fiber.
Figure 2B:
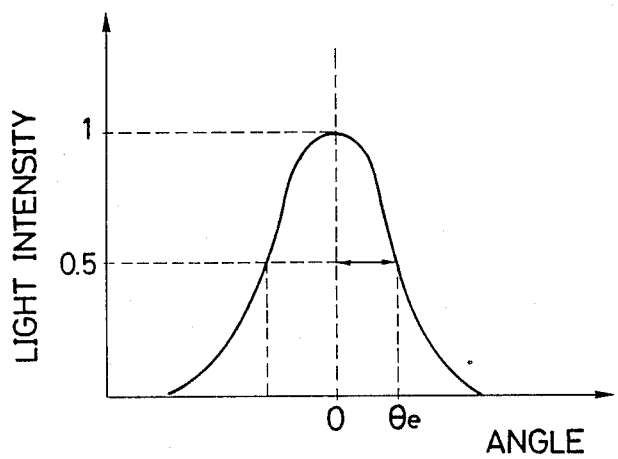
FIG. 2(b) is a graph showing the variation of the intensity of outgoing light with angle.

FIG. 2(a) shows, by way of example, the dependence of numerical aperture NAe on fiber length when higher mode light or lower mode light is introduced into a step index optical fiber of 200 μm or above in core diameter and 0.4 or above in numerical aperture. The numerical aperture NAe is calculated by using: NAe=sin θe, where θe is the half angle at the half maximum of the angular pattern of outgoing light shown in FIG. 2(b). Referring to FIG. 2(a), in either a case where full mode light 21 including much higher mode light, such as light emitted by a LED is introduced into the optical fiber or a case where lower mode light 22, such as laser light, is introduced into the optical fiber, the numerical aperture NAe is a constant regardless of the fiber length when the fiber length is greater than a length S. A state in which the numerical aperture NAe is constant is the state of stationary mode distribution. The value of numerical aperture NAe in the stationary mode distribution is dependent on the material, core diameter and cladding diameter of the optical fiber. For example, the numerical aperture NAe in the stationary mode distribution of a step index PMMA (polymethyl methacrylate) optical fiber of about 1 mm in core diameter is on the order of 0.3. First Embodiment Referring to FIGS. 1(a) and 1(b), a mode scrambler in a first embodiment according to the present invention comprises two cylinders 2 and 3 having the same predetermined diameter and disposed adjacently with a predetermined interval therebetween, and an optical fiber 1 wound around and across the two cylinders 2 and 3 in 8-shaped winds, where the optical fiber 1 has curved portions 4, 5 on the cylinders 2 and 3 respectively, and straight portions between the cylinders 2 and 3. The optical fiber is a plastic optical fiber sheathed with a polyethylene layer and having an outside diameter of 2200 μm, a core diameter of 980 μm, a cladding outside diameter of 1000 μm and a numerical aperture NA of 0.5. Optical fiber connectors 6 and 7 are attached to the extremities of the optical fiber 1.

The dependence of the numerical aperture NA for the out-going light on the number of 8-shaped winds will be shown when varying the outside diameter of the cylinders, the interval between the cylinders, and the light used. 50% NA (sin $\theta a_{50}$, where $\theta_{50}$ is the half angle of the half maximum of the intensity of the outgoing light), and 5% NA (sin $\theta_5$, where $\theta_5$ is the 5% angle of the half maximum of the intensity of the outgoing light) were measured.

Figure 3:
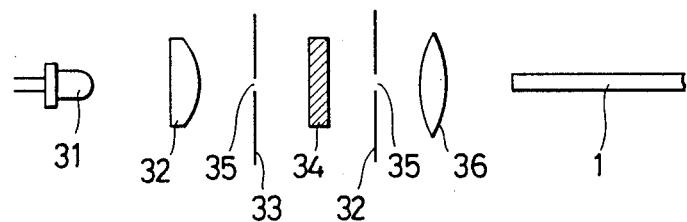
FIG. 3 is an illustration of an arrangement for introducing light emitted from a light emitting diode (hereinafter abbreviated to "LED") into a mode scrambler.

An optical arrangement as shown in FIG. 3 was used to introduce light into the optical fiber 1. The light emitted from a LED 31 was condensed by a lens 32, the condensed light was passed through a pinhole 35 formed in a pinhole plate 33 and filtered by a ND filter 34, passed through a pinhole 35 formed in a pinhole plate 32, and then the light was introduced through a lens 36 having a predetermined NA into the optical fiber 1 at a NA of 0.1 and at a NA of 0.85. Measured results are shown in FIGS. 4, 5 and 6.

In FIG. 4, the outside diameter of the cylinders is 40 mm, the interval between the cylinders is 40 mm, plots represented by blank squares and solid squares indicate the 50% NA and the 5% NA, respectively, where the light is higher mode light of 1.7 dB in transmission loss when the number of the 8-shaped winds is ten, and plots represented by blank triangles and solid triangles indicate the 50% NA and the 5% NA, respectively, where the light is lower mode light of 0.1 dB in transmission loss when the number of the 8-shaped winds is ten.

In FIG. 5, the outside diameter of the cylinders is 40 mm, the interval between the cylinders is 20 mm, plots represented by blank squares and solid squares indicate the 50% NA and the 5% NA, respectively, where the light is higher mode light of 1.6 dB in transmission loss when the number of the 8-shaped winds is ten, , and plots represented by blank triangles and solid triangles indicate the 50% NA and 5% NA, respectively, where the light is lower mode light of 0.4 dB in transmission loss when the number of the 8-shaped winds is ten.

Figure 6:
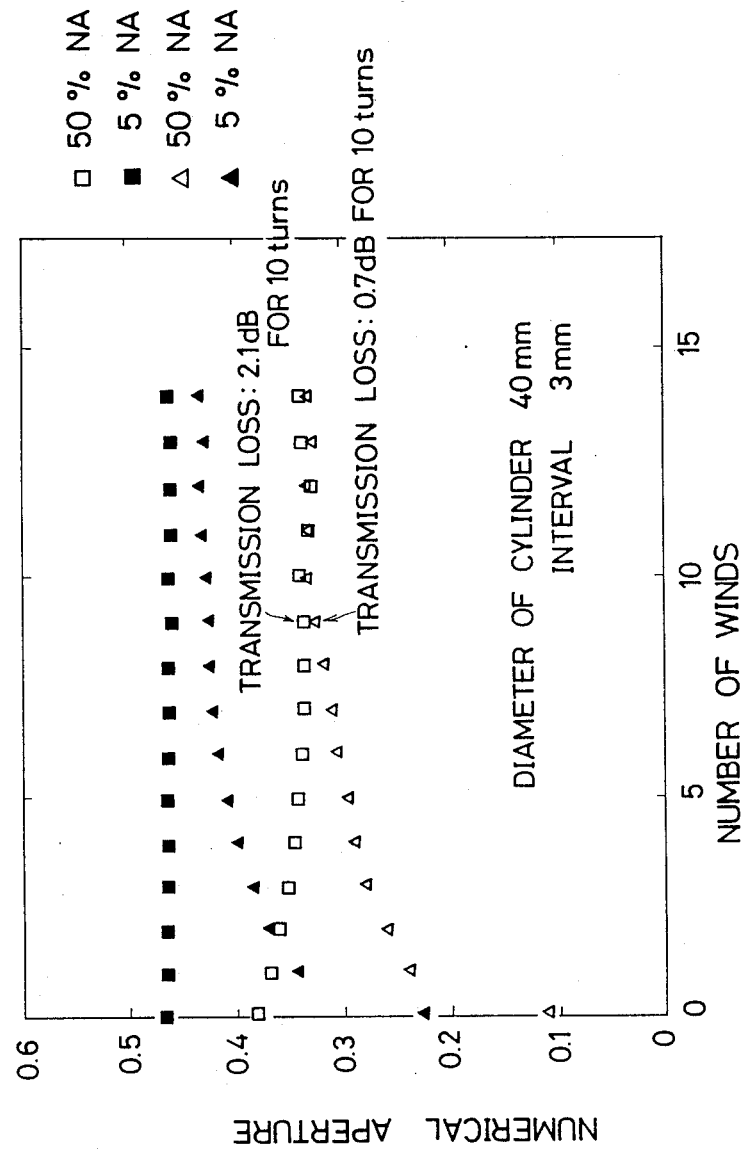

In FIG. 6, the outside diameter of the cylinders is 40 mm, the interval between the cylinders is 3 mm, plots represented by blank squares and solid squares indicate the 50% NA and the 5% NA, respectively, where the light is higher mode light of 2.1 dB in transmission loss when the number of the 8-shaped winds is ten, and plots represented by blank triangles and solid triangles indicate the 50% NA and 5% NA, respectively, and the light is lower mode light of 0.7 dB in transmission loss when the number of the 8-shaped winds is ten.

Figure 7:
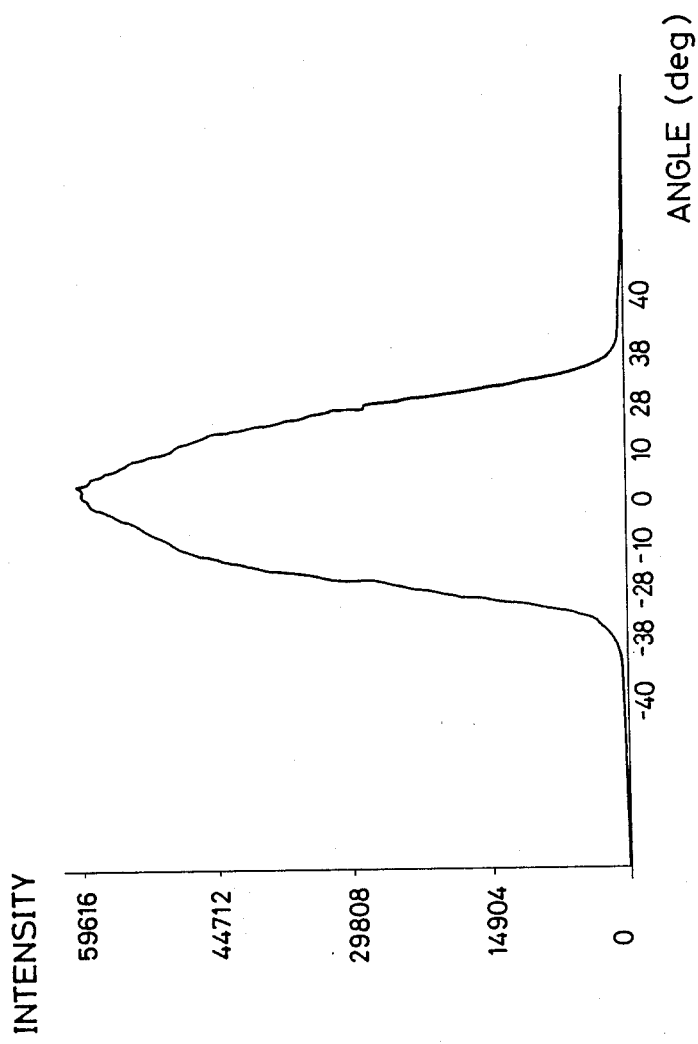
FIG. 7 is a diagram showing a far field pattern.
Figures 10A, 10B:
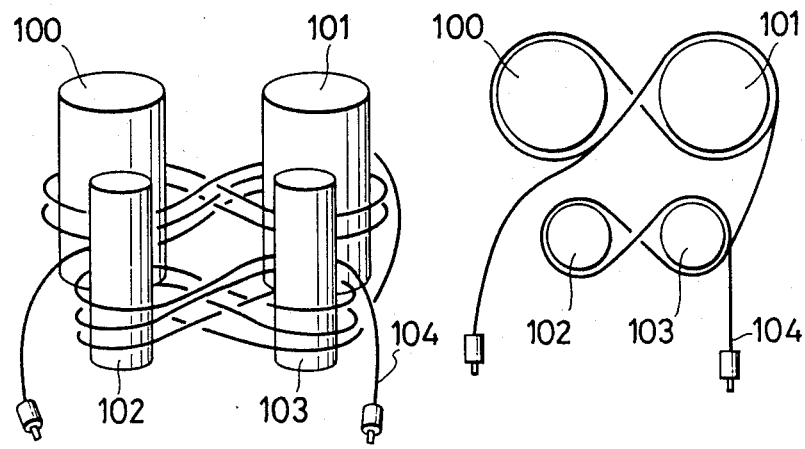
FIGS. 10(a) and 10(b) are a perspective view and a plan view, respectively, of a mode scrambler in a fourth embodiment according to the present invention.

It is evident from the measured results shown in FIGS. 4, 5 and 6 that the mode scramblers in accordance with the present invention are capable of functioning effectively for both higher mode light and lower mode light. Reduction in the interval between the cylinders improves the mode conversion efficiency. When the cylinders are disposed closely with an interval of 3 mm, the 50% NA for higher mode light (NA=0.85) and the 50% NA for lower mode light (NA=0.1) converge on a certain value. FIG. 7 shows a far field pattern in such a state. The far field pattern is similar to a Gaussian distribution. It is known from FIG. 7 that the mode scrambling effect of the mode scrambler is greater when the optical fiber has points of inflection. Second Embodiment Referring to FIGS. 8(a) and 8(b), a mode scrambler in a second embodiment according to the present invention is formed, with reference to conditions calculated with the first embodiment, by disposing two cylinders 80 and 81 having the same diameter at a predetermined interval therebetween, and winding an optical fiber 82 around and across the two cylinders 80 and 81 in alternate 8-shaped winds and loops. This mode scrambler, similarly to that of the first embodiment, is able to provide outgoing light of a stationary mode distribution. If the optical fiber is wound only in loops, the mode scrambler is unable to provide outgoing light of a stationary mode distribution for incident higher mode light. Third Embodiment Referring to FIGS. 9(a) and 9(b), a mode scrambler in a third embodiment according to the present invention is formed by disposing three cylinders 90, 91 and 92 having the same diameter respectively on the apexes of a regular triangle of a predetermined size, and winding an optical fiber 93 around and across the three cylinders 90, 91 and 92 in 8-shaped winds. Fourth Embodiment Referring to FIGS. 10(a) and 10(b), a mode scrambler in a fourth embodiment according to the present invention by disposing a pair of larger cylinders 100 and 101 having the same larger diameter at a predetermined interval and a pair of smaller cylinders 102 and 103 having the same smaller diameter at a predetermined interval, and winding an optical fiber 104 around and across the larger cylinders 100 and 101 and the smaller cylinders 102 and 103 in 8-shaped winds. The smaller cylinders 102 and 103 are disposed symmetrically with respect to a plane of symmetry for the disposition of the larger cylinders 100 and 101.

Figure 11:
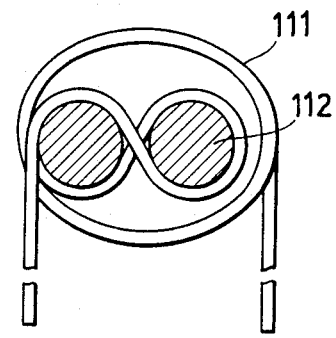
FIG. 11 is a plan view showing a manner of winding an optical fiber around cylinders to reduce local mode retention, in which the outgoing end of an optical fiber is wound several turns around the cylinders in circles of a large diameter.

Optical fibers are wound regularly around and across the cylinders in the first to fourth embodiments. In some cases, local mode is retained without being converted when the optical fiber is wound regularly around and across the cylinders. The local mode retention can be considerably reduced by winding the tail end portion of the optical fiber several turns in large loops 111 surrounding two cylinders 112 as shown in FIG. 11 corresponding to FIG. 1(b).

What is claimed is:

1. A mode scrambler comprising: a plurality of cylinders disposed in a predetermined arrangement; and a step index optical fiber of 100 μm or above in core diameter and 0.4 or above in numerical aperture wound around and across the plurality of cylinders;

characterized in that the step index optical fiber is wound at least in one 8-shaped wind at least across two cylinders among the plurality of cylinders, at least the diameter of one of the two cylinders across which the step index optical fiber is wound in an 8-shaped wind is not less than ten times and not more than fifty times the core diameter of the step index optical fiber, and the diameter of the other cylinder is not less than that of the former cylinder.

2. A mode scrambler according to claim 1, wherein at least one tail end portion of the step index optical fiber is wound at least in one loop at least around the two cylinders across which the step index optical fiber is wound in an 8-shape.

* * * * *

UNITED STATES PATENT AND TRADEMARK OFFICE
CERTIFICATE OF CORRECTION

PATENT NO. : 4,934,787
DATED : Jun. 19, 1990
INVENTOR(S) : Ichimura, et al.

It is certified that error appears in the above-identified patent and that said Letters Patent is hereby corrected as shown below:

On the title page, after item [22] insert the following:
  --[30]  Foreign Application Priority Data August 2, 1988 [JP]      Japan        63-192085/1988
    December 19, 1988 [JP]   Japan        63-318598/1988--

Signed and Sealed this

Eighth Day of December, 1992

*Attest:*

DOUGLAS B. COMER

*Attesting Officer*     *Acting Commissioner of Patents and Trademarks*